C. E. RIEDEL.
BEARING FOR SCALES.
APPLICATION FILED NOV. 16, 1914.
1,143,647.
Patented June 22, 1915.
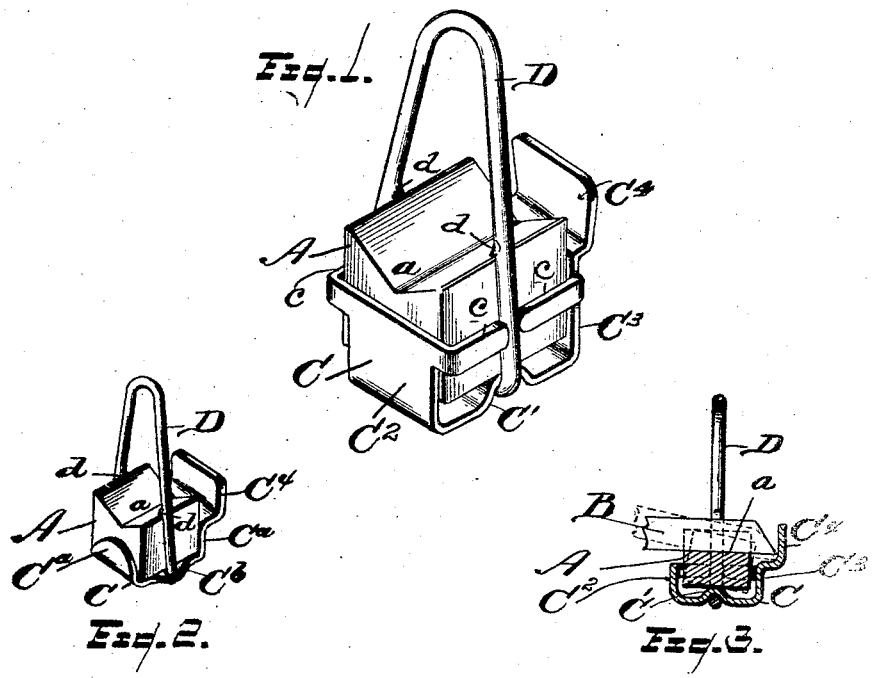
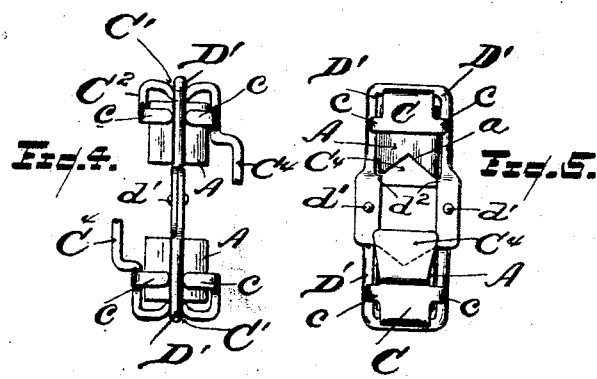

UNITED STATES PATENT OFFICE.

CHARLES EDWARD RIEDEL, OF DETROIT, MICHIGAN, ASSIGNOR TO DETROIT SCALE MANUFACTURING COMPANY, OF DETROIT, MICHIGAN, A CORPORATION OF MICHIGAN.

BEARING FOR SCALES.

1,143,647.  Specification of Letters Patent.  Patented June 22, 1915.

Application filed November 16, 1914. Serial No. 872,360.

*To all whom it may concern:*

Be it known that I, CHARLES EDWARD RIEDEL, citizen of the United States, residing at Detroit, county of Wayne, State of Michigan, have invented a certain new and useful Improvement in Bearings for Scales, and declare the following to be a full, clear, and exact description of the same, such as will enable others skilled in the art to which it pertains to make and use the same, reference being had to the accompanying drawings, which form a part of this specification.

My invention relates to a scale bearing comprising a pendent loop or hanger and means to receive and support an agate bearing block recessed to receive the knife edge pivots of the load platform and the lever mechanism of a weighing scale.

One object of my invention is to provide a device adapted to support and maintain in position an agate bearing whereby the latter may have a free but limited oscillating movement that it may readily adjust itself to a knife edge pivot of the scale mechanism.

A further object of the invention consists in the peculiar construction of the agate bearing case or retainer, the latter having a wall portion spaced from the end of the agate bearing to receive the end thrust of the knife edge pivots of the scale mechanism; a further object of the offset portion being to avoid the lodgment of foreign matter which may sift from the weighing platform onto the bearing and thereby interfere with the weighing action of the scale.

Other advantages and improvements will hereafter appear.

In the drawings accompanying this specification:—Figure 1, is a perspective view of the scale loop retainer supporting the agate bearing. Fig. 2, is a perspective view of a modification of the retainer case or housing for the agate bearing. Fig. 3, is a longitudinal, vertical, sectional view through the device shown in Fig. 1, indicating a fragmentary portion of a knife edge pivot supported in the V-shaped recess of the agate bearing,—the tapering end of the pivot being in contact with the offset or thrust wall of the retainer shell,—the dotted lines indicating the oscillating movement of the parts. Fig. 4, is a side elevation of a modification adapted to support two opposing agate bearing blocks. Fig. 5, is an end elevation of the device shown in Fig. 4.

Referring now to the letters of reference placed upon the drawings:—A, denotes a bearing block preferably of agate, or other suitable material having the usual V-shaped recess *a*.

B, indicates a knife edge pivot of a scale mechanism supported by the agate bearing.

C, is a retainer or shell formed from one piece of metal and provided with a transverse ridge C' on which the bearing A, rests and upon which it is free to tilt that it may adapt itself to the knife edge pivot. The retainer C, is provided with upturned ends C², C³, slightly spaced from the ends of the agate bearing to admit of a restricted rocking movement of the latter. The end wall C³, is provided with an offset portion C⁴ preferably extending above the upper plane of the bearing block.

D, denotes a bail formed of a single piece of wire the ends of which project beneath the retainer, to support the latter, being lodged in the recessed portion C' of the retainer.

*d, d,* are lugs projecting from the bail slightly overlapping the upper edge of the bearing block to hold it against displacement but spaced sufficiently therefrom to permit a free oscillating movement of the block.

*e, e,* indicate fingers integral with the end walls C², C³, of the retainer and loosely embracing the sides of the bearing, their ends contacting with the bail.

In the modification shown in Fig. 2, the retainer or case C for the bearing block is formed of a strip of metal having upturned ends Cᵃ, Cᵃ, closely embracing the ends of the bearing to secure the latter in position, and with projecting ears Cᵇ, slotted for the passage of the bail D, the ends of which are bent beneath the case C to support the case and upon which the latter is adapted to tilt. One of the end walls Cᵃ, of the case is provided with an offset portion C⁴ as in Fig. 1, to receive the end thrust of the pivot.

In the modification indicated in Figs. 4 and 5 a pair of bearing blocks having opposing V-shaped recesses are mounted in retainers or shells similar in form to that indicated in Fig. 1, the retainer shells being connected together by U-shaped loops D' having flattened overlapping ends riveted together as indicated at $d'$;—the flattened portion having a projecting shoulder $d^2$ overlapping the edge of the bearing block A to secure it against displacement.

It will be obvious that a pair of retainer cases of the form indicated in Fig. 2 may be employed to support a double bearing block in place of those shown in Figs. 4 and 5.

Having indicated the several parts by reference letters the construction and operation of the device will be readily understood:— It is well known in the scale art that it is essential to provide for a slight oscillating movement of the bearing block in order that it may adapt itself to the requirements of the knife edge bearing of the scale mechanism;— the bearing blocks usually employed being of agate and very brittle, it is necessary that they be supported in a suitable case or retainer adapted to admit of the oscillation of the bearing. The knife edge bearings having a certain longitudinal movement, it is essential that the movement of the pivot be restricted within certain bounds;—that the friction due to the end thrust of the pivot be reduced to the minimum; and that any foreign matter accidentally sifting down from the weighing platform onto the bearing may not lodge between the end of the knife pivot and its bearing to affect the weighing action of the scale.

In the embodiment shown in Fig. 1, it will be obvious that the agate bearing is free to rock upon the ridge $C'$ of its retaining case, while in the modification shown in Fig. 2 the case carrying the bearing is free to rock upon the supporting bail or hanger. The bearing thus readily adapts itself to the requirements of the knife edge pivot of the scale mechanism. It will also be apparent that the lodgment of foreign matter between the end of the pivot and the wall of the retainer case is avoided by sufficiently spacing the thrust wall of the offset portion of the case from the end of the bearing;— and that by forming the knife edge pivots with ends tapering to a point in alinement with the axis of the bearing, the friction due to the end thrust of the knife edge pivot upon contacting with the wall of the agate bearing case will be reduced to the minimum.

Having thus described my invention what I claim is:—

1. In a device of the character described, a bearing block grooved to receive a pivot, a case to receive said block having a wall offset from the end of the bearing block to receive the thrust of the pivot, and a hanger for supporting said case.

2. In a device of the character described, a bearing block grooved to receive a pivot, an inclosing case for the block provided with a ridge portion upon which the block is adapted to rock, and a loop for supporting the case.

3. In a device of the character described, a bearing block grooved to receive a pivot, an inclosing shell to receive the bearing provided with a transverse ridge upon which the bearing block is adapted to tilt within the shell, said shell having an end wall offset from the bearing block to receive the end thrust of the pivot, and a loop adapted to support the shell.

4. In a device of the character described, the combination of two bearing blocks grooved to receive knife edge pivots, a pair of cases adapted to respectively support one of the bearing blocks, each case being provided with a transverse ridge upon which the bearing block housed therein is adapted to rock and with a wall spaced from the bearing block to receive the end thrust of the knife edge pivots, and means for supporting said cases to maintain the bearing blocks in spaced relation to each other.

5. In a device of the character described, the combination of two agate bearings grooved to receive knife edge pivots of a scale mechanism, a pair of retaining cases adapted to respectively support the agate bearings, each retaining case having a transverse ridge upon which the agate bearing is adapted to tilt, loop hangers adapted to support the retaining cases having overlapping ends riveted together, whereby the bearings are maintained in opposed spaced relation to each other.

6. In a device of the character described, an agate bearing having a groove to receive one of the knife edge pivots of a scale mechanism, a retaining case to receive said agate bearing having an end wall offset from the bearing adapted to receive the end thrust of the knife edge pivot, a knife edge pivot provided with a tapered end designed to bear against the offset wall of the case, and a loop for supporting the retaining case.

In testimony whereof, I sign this specification in the presence of two witnesses.

C. EDWARD RIEDEL.

Witnesses:
SAMUEL E. THOMAS,
LENA WEIGAND.